(12) United States Patent  
Melfi et al.

(10) Patent No.: US 7,135,834 B1  
(45) Date of Patent: Nov. 14, 2006

(54) MODIFIED FIELD ORIENTED CONTROL

(75) Inventors: Michael J. Melfi, Euclid, OH (US); Robert John Breitzmann, South Russel, OH (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 0 days.

(21) Appl. No.: 11/218,447

(22) Filed: Sep. 2, 2005

(51) Int. Cl.  
*H02P 1/16* (2006.01)

(52) U.S. Cl. ............ 318/778; 318/798; 318/815; 318/432; 318/453; 318/807; 318/727; 318/805

(58) Field of Classification Search ........... 318/778, 318/798, 815, 432, 453, 805, 807, 812, 816, 318/801, 802, 804, 806, 727, 799, 800  
See application file for complete search history.

(56) References Cited

U.S. PATENT DOCUMENTS

| | | | | |
|---|---|---|---|---|
| 4,238,715 A | * | 12/1980 | Parsch et al. | 318/135 |
| 5,532,571 A | * | 7/1996 | Masaki et al. | 318/809 |
| 5,717,305 A | * | 2/1998 | Seibel et al. | 318/778 |
| 6,630,809 B1 | * | 10/2003 | Chen et al. | 318/804 |

* cited by examiner

*Primary Examiner*—Karen Masih  
(74) *Attorney, Agent, or Firm*—Patrick S. Yoder; Alexander M. Gerasimow

(57) ABSTRACT

In accordance with certain embodiments, the present technique provides a reduced current field-oriented-control scheme. For example, the present technique provides a method of controlling an induction device in which a predetermined reduction factor is employed to reduce the flux-current vector of a field-oriented-control scheme. By reducing this vector, less current and less power are drawn by the induction device, in turn reducing resistive heating and stator core losses, for instance.

22 Claims, 3 Drawing Sheets

MODIFIED FIELD ORIENTED CONTROL

BACKGROUND

The present technique relates generally to the control of induction machines and, more particularly, to the control of induction machines via field oriented control techniques.

Induction machines, such as motors and generators, are commonly found in industrial, commercial, and consumer settings. In industry, such machines are employed to drive various kinds of devices, including pumps, conveyors, compressors, fans, and so forth, to mention only a few, as well as for the generation of power. In the case of electric motors and generators, these devices generally include a stator, comprising a multiplicity of stator windings, surrounding a rotor.

By establishing an electromagnetic relationship between the rotor and the stator, electrical energy can be converted into kinetic energy, and vice-versa. In alternating current (ac) motors, ac power applied to the stator windings effectuates rotation of the rotor. The speed of this rotation is a function of the frequency of the ac input power (i.e., frequency) and of the motor design (i.e., the number of poles defined by the stator windings). Advantageously, a rotor shaft extending through the motor housing takes advantage of this produced rotation, translating the rotor's movement into a driving force for a given piece of machinery. Conversely, in the case of an ac generator, rotation of an appropriately magnetized rotor induces current within the stator windings, in turn producing electrical power.

Control of such induction machines may be conducted in accordance with field-oriented-control or vector control techniques. In summary, field-oriented-control techniques are used to control the speed and torque of an ac motor by resolving the ac current feed to the stator into a torque-producing current ($i_q$) and a flux-producing current ($i_d$). Such vector analysis allows an induction machine to be viewed as a direct current (dc) device, where field current controls the flux in the device and armature current controls the torque in the device. Descriptions of field-oriented-control schemes are provided in U.S. Pat. No. 5,032,771 that issued on Jul. 16, 1991, to Kerkman et al., and U.S. Pat. No. 5,717,305 that issued on Feb. 10, 1998, to Seibel et al., and both of these patents are incorporated herein by reference. Thus, in traditional field-oriented-control systems, torque control of the motor is effectuated by varying the $i_q$ vector component, while the id vector component remains constant.

However, in many instances, such as in flywheel based uninterruptible power source (UPS) systems—an example of which is described in U.S. patent application Ser. No. 10/944,064, which was filed on Sep. 17, 2004, is entitled "APPARATUS AND METHOD FOR TRANSIENT AND UNINTERRUPTIBLE POWER," and is incorporated herein by reference-less torque is required to maintain continued operation of the device than is required during start-up or loaded conditions. Keeping in mind the relationship between torque and flux, if less torque is required to maintain operational speed, then flux may be lessened as well. Indeed, at low torque requiring conditions, flux vector components levels can be reduced while still maintaining desired operational speeds.

Unfortunately, in traditional field-oriented-control techniques the invariance of the $i_d$ vector component translates into a usage of current that is higher than necessary when the torque required is low. In turn, traditional field-oriented-control techniques draw excess current and excess power, leading to increased costs based on power consumption. Moreover, drawing excess current and power increases resistive heating, hysteresis, and eddy current losses in the stator, all of which are undesirable.

Therefore, there exists a need for improved field-oriented-control techniques.

BRIEF DESCRIPTION

In accordance with certain embodiments, the present technique provides a reduced current field-oriented-control scheme. For example, the present technique provides a method of controlling an induction device in which a predetermined reduction factor is employed to reduce the flux-current vector of a field-oriented-control scheme. By reducing this vector, less current and, of more importance, less power is drawn by the induction device, in turn reducing resistive heating and stator core losses, for instance.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
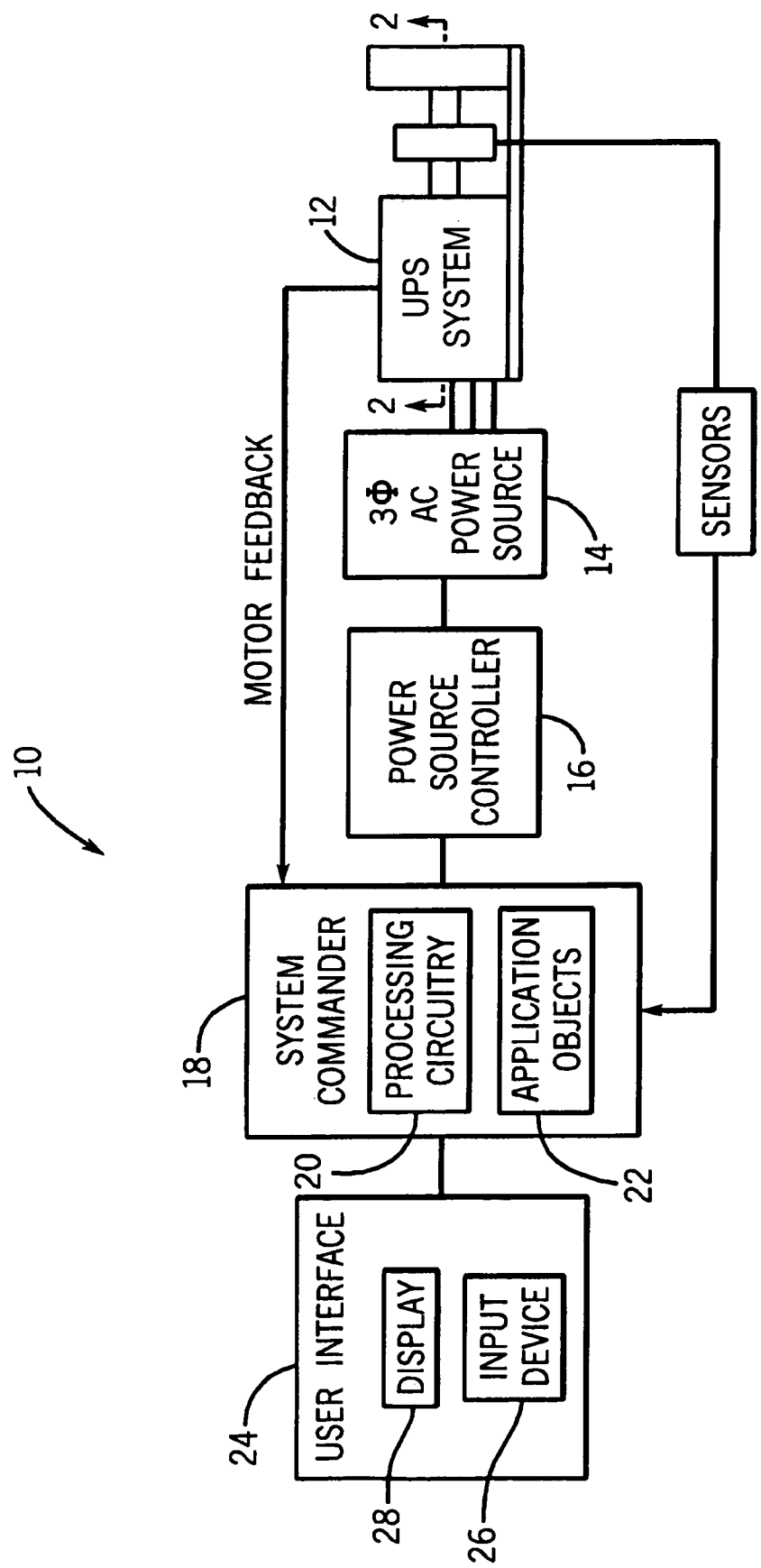
FIG. 1 is a schematic of a system employing field-oriented-control techniques, in accordance with an embodiment of the present technique.

As discussed in further detail below, the present technique relates to field-oriented-control methods and systems. As an example, the present technique employs a flux current vector (id) reduction factor, which, in turn, facilitates a reduction in the overall current and power drawn by the electrical machine during operation at low-torque conditions. FIG. 1 illustrates an exemplary fly-wheel based UPS system that employs the present technique. However, it is worth noting that the following discussion relates to exemplary embodiments of the present technique, and that the appended claims are not to be limited to these discussed embodiments. Indeed, the present technique is applicable to a wide variety of instances where maintaining efficient operation of an induction device is a concern.

The exemplary system 10 of FIG. 1 includes a fly-wheel based UPS system 12 (i.e., an induction device) that receives operating power from an ac power source 14. By way of example, the ac power source 14 can be a sinusoidal one- or three-phase power source. In applications where a variable frequency drive is employed, the power source will typically be a pulse width modulated (PWM) power source that generates output waveforms resembling sinusoidal ac waveforms, but at controlled frequencies. Controlling the power source 14 facilitates control of various parameters of the UPS system 12, such as flywheel torque and speed, by actively managing current, voltage, and frequency parameters, for example, of the outputted ac power. This management of the system is effectuated by a power source controller 16. Further details regarding inertial systems, such as this exemplary fly-wheel system, are described in U.S.

patent application Ser. No. 10/944,064, which, as stated above, is incorporated herein by reference.

The power source controller 16, however, is under the direction of a system commander 18 that receives inputs from the UPS system 12, such as motor feedback signals and speed sensor signals, and produces appropriate output commands. Specifically, the system commander 18 includes hardware and software components, such as the processing circuitry 20 and application objects 22, respectively, that cooperate to produce the appropriate output commands based on the various input parameters. The system commander 18 also receives inputs from a user interface 24 that includes an input device 26 and a display 28.

Figure 2:
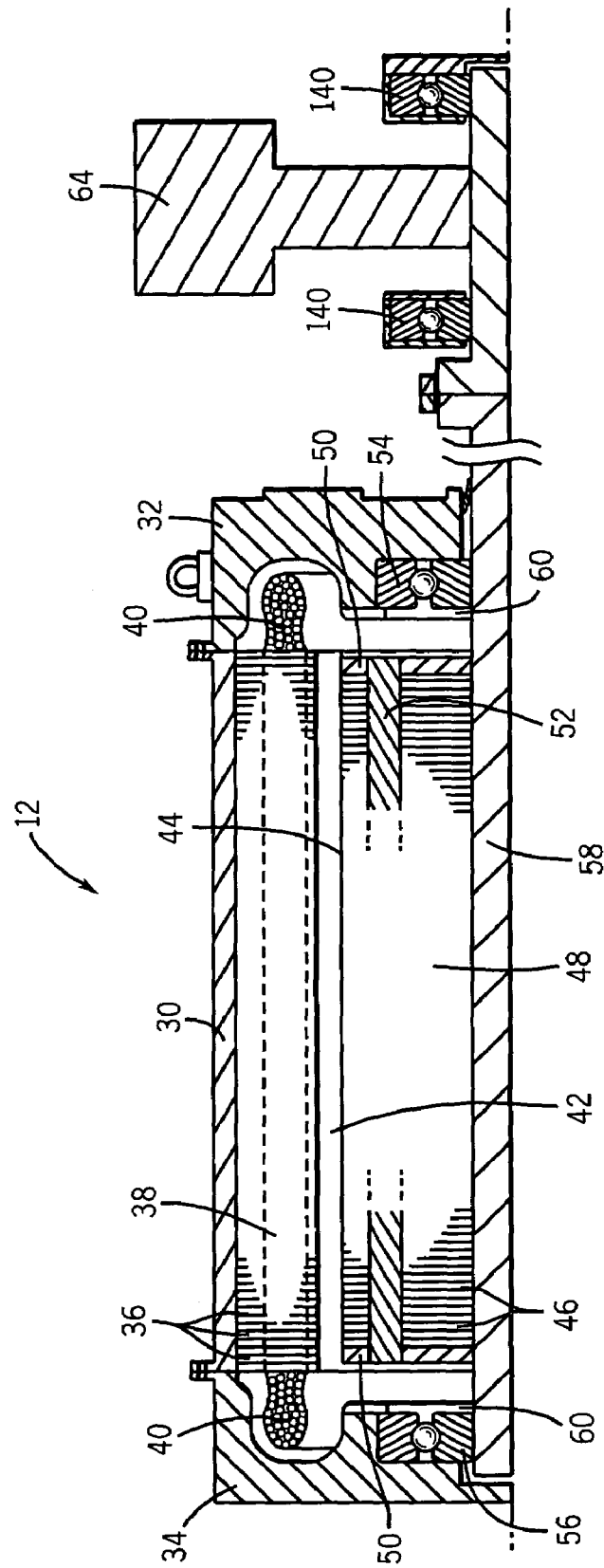
FIG. 2 is a diagrammatic sectional illustration of an electrical machine along line 2—2 of FIG. 1, in accordance with an embodiment of the present technique.

FIG. 2 provides a partial cross-sectional and diagrammatic view of the UPS system 12 along line 2—2 of FIG. 1. The exterior of the UPS system 12 is defined by a frame 30, and drive-end and opposite drive-end endcaps 32 and 34, respectively. Again, these endcaps 32 and 34, in cooperation with the frame 30, provide an enclosure or device housing for the electrical components of the exemplary UPS system 12. Within the enclosure or device housing resides a plurality of stator laminations 36 juxtaposed and aligned with respect to one another to form a stator core 38. The stator laminations 36 each include features that cooperate with one another to form slots that extend the length of the stator core 38 and that are configured to receive one or more turns of a coil winding 40, illustrated as coil ends in FIG. 2. These coil windings 40 are in electrical communication with the ac power source 14 (see FIG. 1). Each stator lamination 36 also has a central aperture. When aligned with respect to one another, the central apertures of the stator laminations 36 cooperate to form a contiguous rotor passageway 42 that extends through the stator core 38.

A rotor 44 resides within this rotor passageway 42. Similar to the stator core 38, the rotor 44 has a plurality of rotor laminations 46 aligned and adjacently placed with respect to one another. Thus, the rotor laminations 46 cooperate to form a contiguous rotor core 48. The exemplary rotor 44 also includes rotor end rings 50, which are disposed on each end of the rotor core 48, that cooperate to secure the rotor laminations 46 with respect to one another. The exemplary rotor 44 also includes rotor conductor bars 52 that extend the length of the rotor 44. These rotor conductor bars 52 are electrically coupled to one another by the end rings 50. Accordingly, the conductor bars 52 and the end rings 50 are formed of nonmagnetic, yet electrically conductive materials and form one or more closed electrical pathways.

To support the rotor 44, the exemplary UPS system 12 includes drive-end and opposite drive-end bearing sets 54 and 56, respectively, that are secured to a shaft assembly 58 and that facilitate rotation of the rotor 44 within the rotor passageway 42. In fact, the exemplary bearing sets 54 and 56 transfer the radial and thrust loads produced by the rotor 44 to the device housing. By way of example, the exemplary bearing sets 54 and 56 have a ball bearing construction; however, the bearing sets may have a sleeve bearing construction, among other types of bearing constructions. Advantageously, the endcaps 32 and 34 include features, such as the illustrated inner bearing caps 60, that releasably secure the bearing sets 54 and 56 in the endcaps 32 and 34.

The shaft assembly 58, in the exemplary embodiment, mechanically couples the rotor 44 to the flywheel 64. That is to say, rotation of the rotor 44 causes the flywheel 64 to rotate, and, conversely, rotation of the flywheel 64 causes the rotor 44 to rotate. The exemplary flywheel 64 includes bearing sets 140 similar to the bearing sets 54 and 56 discussed above. Focusing on the exemplary flywheel 64, it is designed to store and transfer kinetic energy. Accordingly, the exemplary flywheel 64 is formed of composite materials suited to maintain the inertial rotation of the flywheel. Of course, those of ordinary skill in the art, in light of the present discussion, will appreciate that the flywheel 64 may be formed of any number of suitable structural materials. Furthermore, such skilled artisans will also appreciate that the I-shaped cross-section design of the exemplary flywheel is merely but one example of a flywheel design.

During operation, electrical current is provided to the coil windings 40 located in the stator core 38. Routing current through these coil windings 40 produces heat. In fact, resistive heating, as is appreciated by those of ordinary skill in the art, increases as a square of current (i.e., $P=I^2R$). Furthermore, ac currents oscillate between positive and negative directions, leading to corresponding changes in magnetic flux direction in the stator core 38. PWM devices particularly magnify the hysteresis and eddy current losses—which manifest as heat—that resultantly occur from such changes in flux direction. Hysteresis, eddy current, and resistive heating losses can be reduced by reducing the flux in the stator core 38 and the operating ac current level routed through the coil windings 40.

Figure 3:
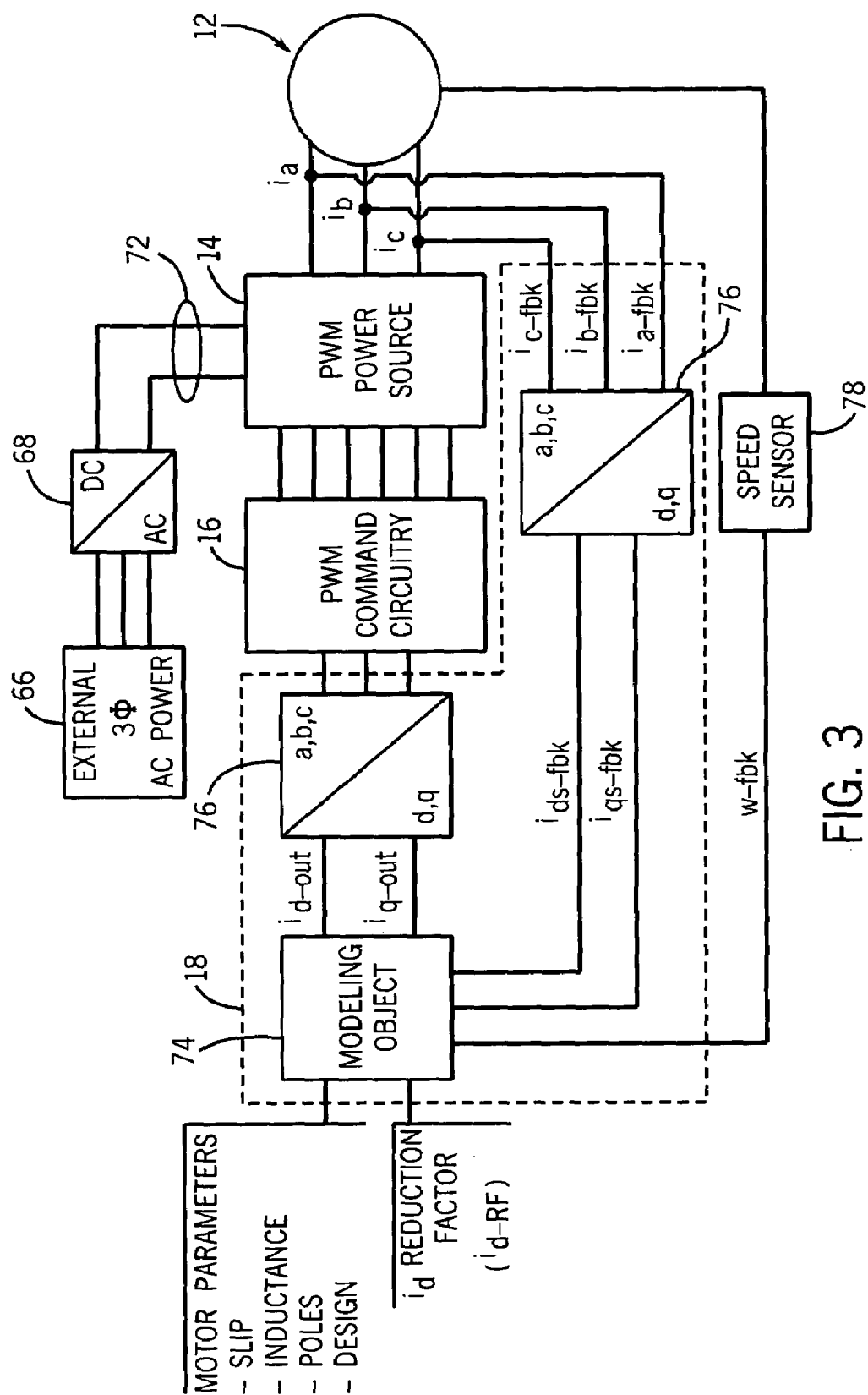
FIG. 3 is a detail schematic of the system introduced in FIG. 1.

FIG. 3 illustrates in further detail the exemplary system introduced in FIG. 1. As illustrated, the UPS system 12 receives three-phase ac power from the PWM power source 14. Specifically, external three-phase power 66 is fed into rectifying circuitry 68 that rectifies this incoming ac power into dc power, which is then transmitted to the PWM device 14 over a dc bus 72. As discussed above, the PWM device 70 provides pulses of current, mimicking the sinusoidal waveform of traditional ac current. Specifically, the PWM device 70 provides three-phases of current to the UPS device: $i_a$, $i_b$, and $i_c$.

The appropriate levels of $i_a$, $i_b$, and $i_c$ are determined by the system commander 18, which, as discussed above, includes various hardware and software components that effectuate the desired output current levels for consumption by the UPS system 12. As illustrated, the system commander 18 includes a modeling object 74 that receives various inputs and uses these inputs to determine appropriate flux-current $i_d$ and torque-current $i_q$ vectors. Those of ordinary skill in the art will appreciate in view of the present discussion that the modeling object 74 transforms three-phase current vectors (i.e., a,b,c) into two vectors (i.e., d, q) that are based on a rotating reference frame, wherein the d-axis and the q-axis are orthogonal to one another. Thus, by adjusting the current vectors in view of this d-and q-axis arrangement, the ac motor, in which current is only provided to the field windings coils, can be operated in a manner similar to a dc motor, where current to the stator controls the magnetic flux of the device and current to the rotating armature controls torque.

To accomplish such vector transformations, the modeling object 74 receives various inputs regarding the UPS system 12, often provided via the user interface 24. For example, the modeling object 74 receives inputs regarding the UPS system design: number of poles; inductance parameters, slip parameter; etc. Additionally, the modeling object 74 receives a predetermined flux-current reduction factor ($i_{d-RF}$) that, as discussed further below, reduces the flux-current vector component, in turn reducing operating current drawn by the UPS system. In response to the inputs, the modeling object 74 determines the full rated flux-current vector and the full rated torque current vector. With the $i_{d-RF}$ value, the modeling object then determines an $i_{d\_out}$ vector by artificially reducing (i.e., subtracting from) the full rated flux-current vector, while the $i_{q\_out}$ vector remains the determined full rated torque-current vector. Because of the reduction factor, current values set in accordance with the $i_{d\_out}$ vector are less than if set with the determined full rated flux-current vector. Again, it is worth noting that the modeling object 74 comprises appropriate software and hardware components, as are appreciated by those of ordinary skill in the art in view of the present discussion. Indeed, such vectorial analysis is described in U.S. Pat. Nos. 5,032,771 and 5,717,305, which, as discussed above, are incorporated herein by reference.

These determined d- and q-axis vectors ($i_{d\_out}$ and $i_{q\_out}$) are then transformed back into the three-phase vector reference plane by a transformation object 76, which comprises appropriate hardware and software components that are appreciated by those of ordinary skill in the art. Through the use of Clarke and Park transformations, which are appreciated by those of ordinary skill in the art, the d, q reference vectors are transformed into the a-,b-,c-axis reference frame, for use by the PWM command circuitry 16 (i.e., the power source controller 16). In turn, the PWM command circuitry 16 provides command signals to the PWM device 14, thus producing the desired $i_a$, $i_b$, and $i_c$ current levels and frequencies for the UPS system 12.

During operation, the modeling object 74 benefits from feedback parameters that facilitate dynamic adjustment of the $i_{d\_out}$ and $i_{q\_out}$ vectors. For example, the output current from the PWM device 14 is fed back to the system commander 18 as the following respective inputs: $i_{a\_fbk}$, $i_{b\_fbk}$, and $i_{c\_fbk}$. These current feedback vectors are transformed into the d, q reference frame by a transformation object 76, resultantly providing $i_{ds\_fbk}$ and $i_{qs\_fbk}$ vectors to the modeling object 74. In turn, the modeling object can make dynamic adjustments to improve the correspondence between $i_{qs\_fbk}$ and $i_{q\_out}$ and between $i_{ds\_fbk}$ and $i_{d\_out}$. Additionally, the modeling object 74 benefits from a speed sensor 78 that monitors the rotation speed of the rotor 44 and that produces a corresponding speed signal ($\omega\_fbk$). With the ($\omega\_fbk$ parameter and knowledge of the UPS system's rated speed or slip vector, the modeling object 74 can determine the status and certain operating conditions of the UPS system 12.

For example, during start-up conditions, the amount of torque required is relatively high. Moreover, the rotational speed of the rotor 44 and the flywheel 64 are relatively low. Thus, during start-up, maximum current is required to achieve the rated speed of the UPS system 12 as soon as possible, and deviation from this rated speed is provided to the modeling object by $\omega\_fbk$. However, once the UPS system 12 reaches an operational steady-state, the inertia of the flywheel 64 and rotor 44 maintains rotation, and much less torque is required. In summary, besides any load placed on the motor, air- and internal-friction are essentially the forces negatively acting on the rotor 44 and flywheel 64, thus requiring very little torque to maintain operating speed.

Through the reduction factor ($i_{d\_RF}$), the total amount of current drawn by the UPS system 12 is reduced, thus reducing resistive heating losses. Further, the reduced flux level facilitates a reduction in eddy current and hysteresis losses, for instance. Specifically, the $i_{d\_RF}$ vector—which is determined by an operator through the use of historical data, for instance—subtracts from the determined ideal flux-current vector to produce the modified $i_{d\_out}$ vector; the determined $i_{q\_out}$ vector, however, remains unaltered. Of course, the artificially reduced $i_{d\_out}$ vector reduces the amount of flux in the UPS system 12. However, additional flux is not necessary, as very little torque is required to maintain the rotation of the rotor and flywheel, which have large amounts in inertia. Thus, in comparison to a traditional field-oriented-control scheme, which operates at maximum flux levels and bases torque-current vectors on maintaining operating speed, the use of the reduction factor $i_{d\_RF}$ artificially decreases the flux-current vector and, in turn, reduces the amount of current and power drawn.

However, if during operation the speed of the rotor 44 and flywheel 64 drops below the rated speed and additional torque is required to return to the steady-state operating condition, the system 12 will work to return to its rated speed. Thus, the system 12 will draw the appropriate current. In certain implementations, the system 12 will return to its rated speed slower than traditional system because of the artificially reduced flux.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of controlling an induction machine, comprising:
    determining full rated flux-current and torque-current vectors in accordance with a field oriented control scheme and based on design parameters of the induction machine;
    generating an output signal representative of an output flux-current vector, wherein the output flux-current vector is based on the full rated flux-current vector and a predetermined flux-current reduction factor; and
    controlling an alternating current (ac) power source to the induction machine based on the determined full rated torque-current vector and the generated output flux-current vector.

2. The method as recited in claim 1, comprising controlling a pulse width modulated (PWM) ac power source based on the determined full rated torque-current vector and the generated output flux-current vector.

3. The method as recited in claim 1, comprising generating an output torque-current vector, and adjusting the output torque-current or output flux-current vectors or any combination thereof based on feedback signals from the induction machine.

4. The method as recited in claim 3, comprising adjusting the output torque-current vector or the output flux-current vector or any combination thereof based on a current feedback signal representative of output current from the ac power source.

5. The method as recited in claim 3, comprising adjusting the output torque-current vector or the output flux-current vector or any combination thereof based on an operating parameter of the induction machine.

6. The method as recited in claim 5, wherein the output parameter of the induction device comprises an operating speed of the induction machine.

7. A method of controlling an induction device, comprising:
    determining a full rated d-axis current vector and a q-axis current vector based upon a field-orientated-control scheme and design parameters of the induction device;
    determining a d-axis output current vector based on the full-rated d-axis current vector and a predetermined flux-current reduction factor;
    resolving the q-axis current vector and the d-axis output current vector into a-, b-, and c-axis current vectors; and providing alternating current (ac) power to the induction device in accordance with the a-, b-, and c-axis current vectors.

8. The method as recited in claim 7, comprising controlling a pulse width modulated (PWM) power source.

9. The method as recited in claim 7, comprising dynamically adjusting the d-axis and q-axis current vectors based on feedback parameters from the induction device.

10. The method as recited in claim 7, comprising dynamically adjusting the d-axis and q-axis current vectors based on feedback parameters based on the provided ac power.

11. The method as recited in claim 7, comprising determining the reduction factor based on historical data of the induction device.

12. The method as recited in claim 7, comprising providing dc power to a pulse width modulating (PWM) power source.

13. The method as recited in claim 12, comprising rectifying an ac power signal to produce the provided dc power.

14. An induction system, comprising:
an induction device comprising a stator core having a plurality of stator windings extending therethrough and a rotor disposed concentric to the stator core;
an alternating current (ac) power source configured to provide three-phase ac power to the stator windings;
a controller configured to command the ac power source, and
a system commander configured to determine a-, b-, and c-axis vectors of the three-phase ac power in response to provided flux-current and torque-current vectors to command the controller, wherein the system commander is configured to determine the provided flux-current and stator-current vectors in accordance with a field oriented control scheme and based on design parameters of the induction device, the flux-current vector also being based on a predetermined reduction factor.

15. The induction system as recited in claim 14, comprising a transformation object configured to transform the flux-current vector and the stator-current vector into the a-, b-, and c-axis vectors.

16. The induction system as recited in claim 14, wherein the rotor is mechanically coupled to a flywheel.

17. The induction system as recited in claim 14, comprising a sensor configured to determine an operating speed of the rotor.

18. The induction system as recited in claim 14, wherein the ac power source comprises a pulse width modulated (PWM) power source.

19. A system controller for an induction device, comprising:
a processor; and
a modeling object stored on one or more tangible media coupled to the processor, and operable with the processor to produce full rated flux-current and torque-current vectors based on a field oriented control scheme and design parameters of the induction device, wherein the modeling object is configured to produce a flux-current output vector based on the full rated flux-current vector and a predetermined flux-current reduction factor.

20. The system controller as recited in claim 19, comprising transformation objects.

21. A tangible medium comprising computer program for operating an induction machine, the computer program comprising:
code for determining full rated flux-current and full rated torque-current vectors in accordance with a field-oriented-control scheme and based on design parameters of the induction machine;
code for determining an output flux-current vector, wherein the output flux-current vector is based on the full rated flux-current vector and a predetermined flux-current reduction factor; and
code for producing an output signal to control an alternating current (ac) power source to the induction machine based on the determined full rated torque-current vector and the determined output flux-current vector.

22. The computer program as recited in claim 21, comprising code for transforming the output flux current vector and full rated torque-current vector into a-, b-, and c-axis vectors.

* * * * *